United States Patent [19]
Casey

[11] 3,834,668
[45] Sept. 10, 1974

[54] PIPE PUSHING APPARATUS

[76] Inventor: John William Casey, 138 William Ave., New Richmond, Wis. 54017

[22] Filed: Jan. 11, 1973

[21] Appl. No.: 322,853

[52] U.S. Cl. .............................................. 254/29 R
[51] Int. Cl. ............................................. E21b 9/00
[58] Field of Search .................................. 254/29 R

[56] References Cited
UNITED STATES PATENTS
| | | | |
|---|---|---|---|
| 2,060,214 | 11/1936 | Hitchens | 254/29 R |
| 2,685,430 | 8/1954 | Henke | 254/29 R |
| 3,726,506 | 4/1973 | Vanderwoal | 254/29 R |

FOREIGN PATENTS OR APPLICATIONS
| | | | |
|---|---|---|---|
| 547,213 | 5/1956 | Belgium | 254/29 R |

Primary Examiner—Al Lawrence Smith
Assistant Examiner—Robert C. Watson
Attorney, Agent, or Firm—H. Dale Palmatier; James R. Haller

[57] ABSTRACT

Apparatus for driving a rod or pipe through the ground, including a hydraulically-actuated piston driving member coupled to a pair of pipe-gripping jaws which are themselves pivotally mounted on a slideable carriage assembly, wherein the driving member forces the jaws to clamp the pipe and simultaneously drives the slideable carriage assembly to force the pipe into the ground.

7 Claims, 5 Drawing Figures

PATENTED SEP 10 1974

3,834,668

PIPE PUSHING APPARATUS

This invention relates to an apparatus for forcing a pipe or rod through the ground, and is particularly adaptable for driving metal pipe or conduit beneath the surface of a roadway. The use of the invention enables the installation of pipes or conduits beneath roadways or other surfaces without the necessity of trenching or othwrwise disturbing the surface above the pipe or conduit.

An object of this invention is to provide an economical and efficient means for driving a pipe or rod beneath the surface of the ground. Another object is to provide an economical and efficient means for removing a pipe or rod from beneath the surface of the ground.

These objects are accomplished in this invention by means of a novel hydraulically driven apparatus having a pipe gripping and clamping mechanism which is suitable for both forcing pipe into the ground and also removing said pipe.

Hydraulically driven devices for forcing pipe through the ground beneath the surface are known in the art. They are useful in this application because of the large forces which can be developed through the use of hydraulics. These forces are conventionally applied to a pipe in one of two ways: either the driving force is applied directly to the end of the pipe being driven into the ground, or the driving force is applied to a pipe gripping mechanism and is transferred to the pipe by means of this pipe gripping mechanism. Apparatus of the first type are difficult to use because they must be adaptable to accomodate pipes of varying lengths; apparatus of the second type are faced with the problem of the design of a suitable gripping mechanism which will not slip when the driving force is applied. Further, conventional hydraulic driving mechanisms have a relatively short driving stroke which requires that the gripping mechanism be clamped to the pipe during the driving (forward) stroke and released from the pipe during the rearward stroke when the hydraulic device is returned to its initial driving position. This action requires that the gripping mechanism firmly grasp the pipe during one direction of hydraulic motion and quickly release the pipe during the opposite direction of motion. Of course, when a pipe is being retracted from the ground, the two gripping directions are reversed and the gripping mechanism should be adaptable to accomodate this reversal of force.

The present includes a novel pipe gripping mechanism which can be simply and conveniently set to firmly grasp a pipe in either direction of motion and will slide freely along the pipe in a non-gripping fashion when the hydraulic driver moves in the opposite direction. An understanding of this invention and its advantages will be apparent from the following specification and drawings, in which.

Figure 1:
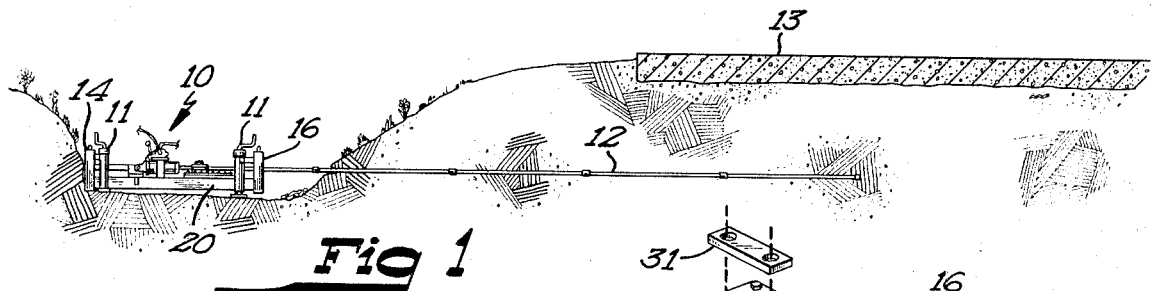
FIG. 1 illustrates a side cross sectional view of the invention in a typical operation.

Referring first to FIG. 1, the invention 10 is shown in a typical operating position, driving a pipe 12 beneath the surface of a roadway 13. The invention 10 is located at a suitable depth by means of a trench or ditch which is dug adjacet the roadway. The relative angular position of the invention is adjusted by means of leveling jacks 11, which are usually set to allow the pipe 12 to be driven in a generally horizontal direction. When the invention is used for driving pipe into the ground it is positioned with its rear bulkhead 14 as shown in FIG. 1. When the invention is used for retracting pipe from the ground it is supported by means of front bulkhead 16, which is similarly braced against the soil.

Figure 2:
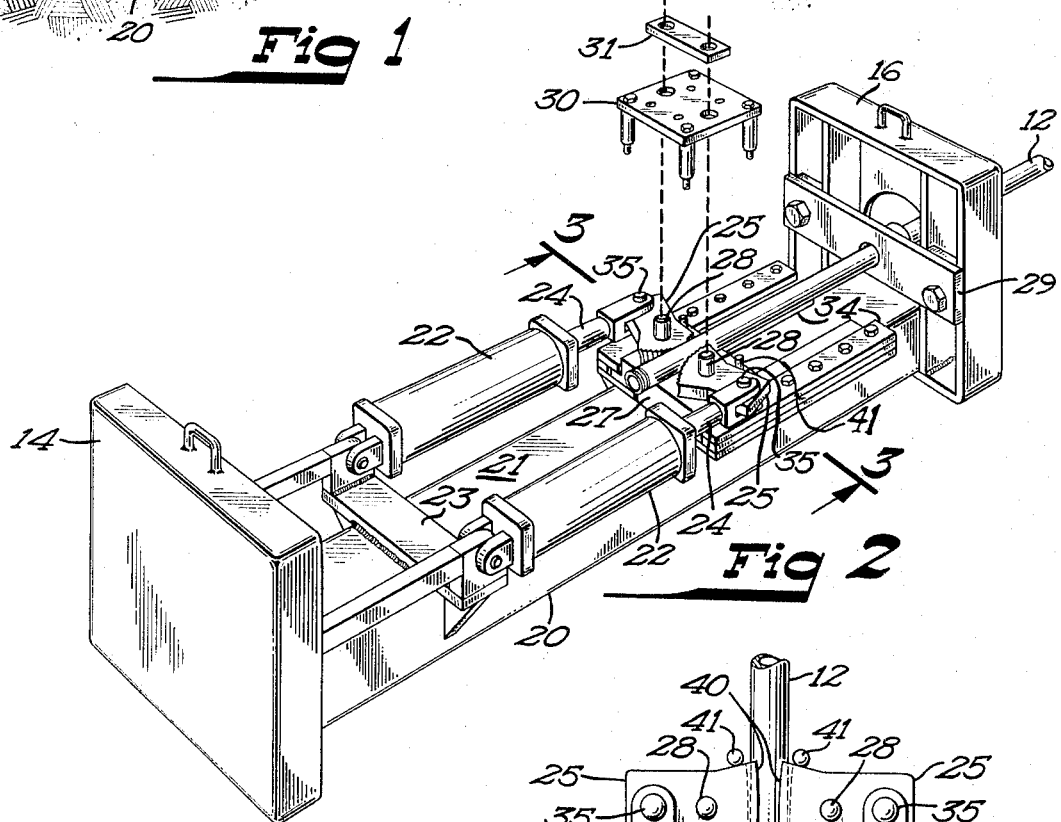
FIG. 2 is a perspective view of a significant portion of the invention.

FIG. 2 illustrates the invention in perspective view. Rear bulkhead 14 and front bulkhead 16 are securely interconnected by means of frame 20. Leveling jacks 11 are not shown in FIG. 2, but may be attached either to frame 20 or the respective bulkheads. A pair of hydraulically operated pistons 22 are fastened at respective ones of their ends to frame 20 by means of bracket 23, which is welded or bolted to frame 20. The hydraulic lines and other hydraulic driving apparatus is not shown in FIG. 2 for purposes of clarity; these elements may be of any type conventionally known and used in the art. Hydraulic pistons 22 are of a conventional type yielding linear motion of their shafts 24 upon the application of hydraulic pressure. Shafts 24 are pivotally connected to a pair of pipe-gripping jaws 25; jaws 25 are also pivotally mounted to a slidable bearing plate 27 by means of pins 28. Bearing plate 27 slides over bed 21 which forms a top surface of frame 20. Pipe 12 fits between pipe-gripping jaws 25 and is guided into the ground via pipe guide 29, having a hole slightly larger than the diameter of pipe 12.

Pipe-gripping jaws 25 pivot about pins 28 upon the application of linear driving force from hydraulic pistons 22 via shafts 24. As shown in FIG. 2, jaws 25 are illustrated in a first pivoted position, said position caused by the outward movement of shaft 24 from hydraulic pistons 22. This outward movement corresponds to a driving force from hydraulic pistons 22 in a direction to force pipe 12 into the ground. Hydraulic pistons 22 are also capable of retracting shafts 24 into the hydraulic cylinders, in which case jaws 25 pivot in an opposite direction about pins 28. The detailed interaction of jaws 25 with pipe 12, in response to hydraulic driving forces in either direction, will be described hereinafter.

Cover plate 30 may be mounted over jaws 25 and a portion of pipe 12 to secure jaws 25 to bearing plate 27. Cover plate 30 has holes for passage of pins 28, and has other holes for locating other pins as will hereinafter be described. Pin bearing plate 31 may be laid atop cover plate 30 for the purpose of locating pins 28 and providing a base for anchoring these pins relative to one another. Both cover plate 30 and pin bearing plate 31 are used for locating and holding pins relative to one another and may be necessary because of the extreme hydraulic forces that exist when the invention is in operation. Without these plates there exists the possibility of developing shear forces sufficient to damage or destroy one or more pins. Also, cover plate 30 holds jaws 25 against bearing plate 27 to prevent any vertical movement which might otherwise occur.

When pipe-gripping jaws 25 are clamped against pipe 12 as shown in FIG. 2, and hydraulic pistons 22 are activated to cause an outward force, this linear force is transmitted to jaws 25 through shafts 24. The force causes jaws 25 to pivot about pins 28 in the directions shown in FIG. 2, increasing the clamping force against pipe 12. The linear force also causes bearing plate 27, which is fastened to jaws 25 by means of pins 28, to move forwardly in the direction of bulkhead 16. Since bearing plate 27 is slideable upon bed 21, this forward motion is unrestricted. Therefore, the hydraulic force causes the entire assembly consisting of bearing plate 27, pins 28, jaws 25, and cover plate 30 to move in a direction toward bulkhead 16. After hydraulic pistons 22 have reached their forwardmost position hydraulic pressure is introduced to cause them to retract back into their cylinders. This produces a linear force in the opposite direction on jaws 25, causing them to pivot oppositely about pins 28. Unless otherwise restrained, the opposite pivoting motion will cause jaws 25 to again clamp pipe 12 and force pipe 12 to retract from the ground a distance approximately equal to the forward stroke of hydraulic pistons 22. However, means are provided, to be described hereinafter, to restrain jaws 25 from fully pivoting about pins 28 when hydraulic pistons 22 are retracted.

Figure 3:
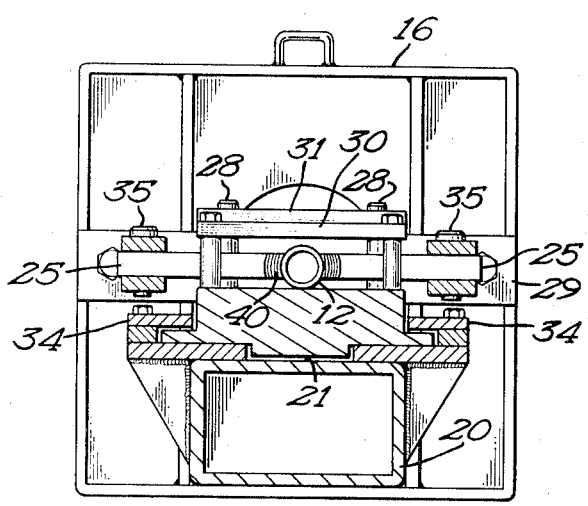
FIG. 3 is a sectional elevational view of a portion of the invention taken on the line 3—3 of FIG. 2.

The attachment of jaws 25 to bearing plate 27 can best be seen from FIG. 3, which is a sectional elevational view of the portion of the invention taken on line 3—3 of FIG. 2. Bearing plate 27 has a shoulder on each of its edges which fits between bed 21 and lip plate 34. The shoulders are slideable between plate 34 and bed 21, and serve to prevent vertical movement of bearing plate 27 and elements attached thereto. FIG. 3 illustrates the teeth of jaws 25 urged against the diameter of pipe 12. These teeth have a general curvature which is complementary to the diameter of pipe 12 which allows jaws 25 to grip against a significant portion of the pipe circumference. FIG. 3 also illustrates cover plate 30 and pin bearing plate 31 attached to bearing plate 27; cover plate 30 is bolted, by means of spacer bolts, to the top surface of bearing plate 27. Pin bearing plate 31 is fitted over pins 28. The ends of shafts 24 (FIG. 2) are fitted with U-clamps which are attached to jaws 25 by means of anchor pins 35. These anchor pins transmit the hydraulic force from pistons 22 to jaws 25, causing jaws 25 to pivot about pins 28.

Figure 4:
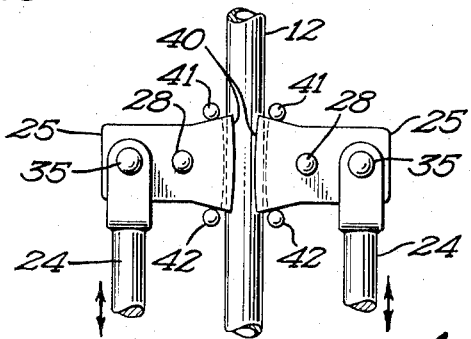
FIG. 4 is a top plan view of the gripping portion of the invention.

FIG. 4 is a top plan view of the pipe gripping portion of the invention. Pipe 12 is shown disposed between pipe-gripping jaws 25, which are in their mid-position. In this position, jaws 25 exert no clamping force against pipe 12, there being a slight clearance between the outer circumference of pipe 12 and the jaw teeth. However, linear hydraulic force transmitted through shafts 24 in either of the directions shown by the arrows cause a corresponding force on pins 35. This causes jaws 25 to pivot about pins 28, which in turn causes the jaw teeth to clamp against pipe 12. The curvature 40 of jaws 25 has a radius much greater than the pivot radius measured from pins 28 to pipe 12. Therefore, when the jaw is pivoted about pin 28 the edge curvature 40 will tend to move toward the center of pipe 12, clamping pipe 12 between jaws 25 very tightly. This clamping action increases with linear force transmitted through shafts 24, thereby increasing the clamping of jaws 25 against pipe 12 as the linear force against the pipe is increased. For example, if pipe 12 encounters resistance as it is being driven through the ground, the hydraulic driving force will be increased against the pipe to overcome this ground resistance and the jaws 25 will correspondingly increase their clamping force against the pipe 12 to prevent slipping. In this manner jaws 25 clamp against pipe 12 with a force that is proportional to the force which is required to drive pipe 12 into the ground.

The angular displacement of jaws 25 about pins 28 is dependent upon the clamping force, the relative clearance between pipe 12 and jaws 25 in their mid-position, the curvature 40 of the jaw edges, and the radial distance of pins 28 from jaw curvature edge 40. These parameters are all chosen so as to obtain an angular displacement of 5°–20° about pin 28 in a typical embodiment. Other factors being equal, the diameter of pipe or rod 12 will control the transverse shape of the jaw faces of jaws 25. The transverse shape of the jaw faces as illustrated in FIG. 3 is to precisely conform to the exterior shape of the pipe or rod 12 being pushed so as to maximize the surface area of engagement between the jaws and the pipe. For pipes or rods of various sizes, the jaws 25 will be replaced with other jaws, the jaw faces of which have a suitable curvature to match that of the pipe.

As previously stated, when hydraulic force is transmitted via shafts 24, an angular displacement of jaws 25 clamps pipe 12 between the jaws and the entire assembly including jaws 25 and bearing plate 27 is moved in the direction of hydraulic force, driving the pipe in the same direction. This is also true for a hydraulic force in the opposite direction wherein jaws 25 are pivoted into an opposite angular position to grip against pipe 12 in a reverse direction. The clamping of the pipe by jaws 25 is prevented by restraining the angular travel of the jaws about pins 28. As shown in FIG. 4, front pins 41 restrain the angular displacement of jaws 25 in a first direction, and rear pins 42 restrain the angular displacement of jaws 25 in a second direction. Each of the pins 41 and 42 is removable and typically only one pair of pins 41 or 42 is used to restrain angular jaw displacement. If all four pins 41 and 42 were inserted into their locating holes in bearing plate 27 jaws 25 would be held in their mid-positions and would not come into contact with pipe 12. Therefore jaws 25 would slip over pipe 12 during both the front and rear hydraulic piston strokes. If pins 41 were inserted, as shown in FIG. 4, angular jaw displacement would be restrained during the downward piston stroke and unrestrained during the upward piston stroke. This would cause jaws 255 to clamp against pipe 12 during the upward piston stroke but would prevent jaws 25 from clamping pipe 12 during the downward piston stroke.

If pins 41 were removed and pins 42 were inserted as shown in FIG. 4 the reverse clamping would occur, and jaws 25 would clamp pipe 12 during the downward piston stroke and release pipe 12 during the upward piston stroke. Selective placement of pins 41 or pins 42 therefore enables the operator to control the direction of linear force during which the pipe will be clamped. In this manner the operator can use the invention either to drive pipe into the ground or to retract pipe from the ground. Moreover, the operation can be changed by simply moving pins 41 or pins 42 into their respective opposite holes.

Figure 5:
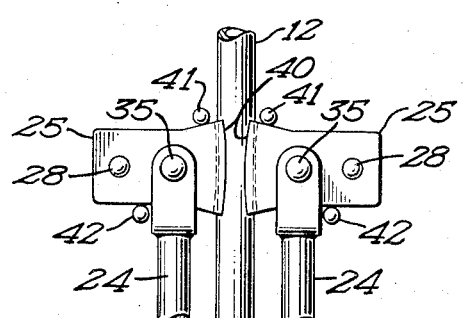
FIG. 5 is an alternative top plan view showing another embodiment of the gripping portion of the invention.

FIG. 5 illustrates an alternative embodiment of the pipe gripping portion of the invention, wherein the hydraulic piston shafts 24 are attached to jaws 25 at a point closer to the pipe and pivot pins 28 are located at a greater distance from the pipe 12. The operation of this embodiment is similar to that described hereinbefore, the major difference being an increase in the pivot pin 28 radius of angular displacement. Rear pins 42 are displaced somewhat to accomodate the shaft 24 U-clamp, but otherwise serve the same function as explained previously. Other changes could be made to the embodiment described herein without significantly affecting the novel features of the invention. For example, a single hydraulic piston assembly, with suitable linkages to the pipe-gripping jaws, could replace the double hydraulic pistons described herein.

A typical working embodiment of this invention has driven pipe a distance in excess of 100 feet through the ground at a depth of approximately 4 feet. The pipe was interconnected from a series of 5 foot sections, and the invention utilized an 18 inch forward stroke hydraulic piston assembly. As each 5 foot pipe section was driven into the ground, another section was threaded onto the projecting pipe end.

What is claimed is:

1. Apparatus for driving a pipe through the ground, comprising:
   a. an elongated base support structure having groundabutting end plates for securing said support structure against the ground;
   b. a pipe guide member attached to one of said end plates;
   c. a carriage assembly slideably mounted on said base support structure;
   d. a pair of opposed, confronting pipe-gripping jaws pivotally mounted to said carriage assembly for gripping a pipe therebetween, each jaw having a jaw edge with a radius of curvature greater than the distance between said jaw pivot mounting point and said jaw edge to alternately grip and release the pipe as the jaw is slightly pivoted in opposite directions, said carriage having pins in the path of pivotal movement of the jaws and positioned to prevent movement of the jaws in one direction from a rod releasing position to a rod gripping position;
   e. a linear force driving member, anchored at one of its ends to said base support structure, and pivotally attached at its other end to each of said pipe-gripping jaws at a point removed from said jaw pivot mounting.

2. Apparatus as claimed in claim 1 wherein said linear force driving member comprises a pair of hydraulically actuated piston, each having one end anchored against said base support structure, and a second moveable end pivotally attached to respective ones of said pipe-gripping jaws at a point removed from said jaw pivot mounting.

3. Apparatus as claimed in claim 1, further comprising jack means attached to said base support structure for adjusting the relative angle of inclination of said base support structure.

4. Apparatus as claimed in claim 1 wherein said carriage assembly further comprises a bearing plate slideable over said base support structure surface.

5. Apparatus for driving a rod generally horizontally through the ground, comprising:
   a. an elongate horizontal base support structure having bulkheads at its ends to bear against the ground in one direction as the rod is driven in the opposite direction, one of said bulkheads having an opening therethrough through which the rod will be driven into or drawn from the ground, said base structure having a track extending longitudinally thereof;
   b. a pair of horizontal and parallel hydraulic cylinders spaced from each other to permit the rod to be laid therebetween, each of the cylinders having one of its ends attached to the base support structure and having at its other end an extensible and retractable piston rod;
   c. a carriage assembly adjacent said piston rods and slideably mounted on the track of said base structure for movement in a direction parallel to said piston rods;
   d. a pair of rod-gripping jaws opposite each other to engage and grip opposite sides of the rod, each jaw being pivotally mounted by upstanding pivot pins on the carriage assembly and having a jaw face with a curvature of a radius greater than the distance between the jaw mounting pivot and said jaw face to alternately grip and release the rod as the jaw is slightly pivoted in opposite directions, said jaw faces having transverse configurations identical to the periphery of the rod being pushed;
   e. means for pivotally attaching each of said piston rods to a respective rod-gripping jaw whereby to swing the jaws from their rod-releasing position into their rod gripping position on the rod with either extension or retraction movement of the piston rod and thereby move the rod with the piston rods in both extension and retraction directions;
   f. a pair of removable pins on the carriage assembly in position to respectively obstruct swinging of the jaws from their release position toward one gripping position of the jaws as the jaws are moved in one direction by the piston rods and thereby permit the jaws to pass along the rod without gripping the rod, the jaws being free to swing away from said pins as the piston rods are moved in the opposite direction whereby to grip and move the rod with the jaws and piston rods; and
   g. a rigid plate overlying said jaws and having bearing apertures receiving the upstanding pivot pins of the jaws, the pivot pins of the jaws also protruding downwardly from the jaws into the carriage assembly, said plate accurately locating the jaws relative to each other and relative to the pipe being gripped therebetween.

6. The apparatus according to claim 5 and said pair of removable pins being alternately locatable on the carriage at opposite sides of the jaws so as to selectably prevent pivoting of the jaws in a desired direction, whereby to control the direction of driving force applied to the rod.

7. An apparatus for driving a pipe generally horizontally through the ground, comprising:
   a. an elongate, horizontal base support structure having end bulkheads to bear against the ground in one direction as the pipe is driven in the opposite direction, the base structure having a track extending longitudinally thereof;
   b. a carriage carried by the track and movable longitudinally of the base structure;
   c. a pair of opposed, confronting pipe-gripping jaws pivotally mounted to the carriage assembly and positioned to receive a pipe therebetween, the jaws having opposed jaw faces each having a radius of curvature greater than the distance between the pivotal mounting of the jaw and the jaw face so as to move from a pipe-releasing position to a pipe gripping position as the jaws are pivoted together from a pipe-releasing position in one direction and also in the opposite direction;

d. a pair of horizontal and parallel hydraulic cylinders including extensible and retractable piston rods, the cylinders being attached at one end to the base support structure and at their other ends, respectively, to the pipe-gripping jaws at points spaced from the pivotally mounting of the jaws to the carriage, whereby actuation of the hydraulic cylinders causes the jaws to pivot; and e. means preventing pivoting of said jaws in one direction from a release position to a pipe-gripping position.

* * * * *